United States Patent
Jooste

(10) Patent No.: US 10,255,333 B2
(45) Date of Patent: *Apr. 9, 2019

(54) LOCAL CLIENT DATABASE FOR REMOTE SUPPORT

(71) Applicant: Dell Products LP, Round Rock, TX (US)

(72) Inventor: Sarel Kobus Jooste, Pretoria (ZA)

(73) Assignee: Dell Products LP, Round Rock, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/503,851

(22) Filed: Oct. 1, 2014

(65) Prior Publication Data

US 2015/0019538 A1   Jan. 15, 2015

Related U.S. Application Data

(63) Continuation of application No. 11/970,970, filed on Jan. 8, 2008, now Pat. No. 8,874,618, which is a continuation of application No. 09/954,397, filed on Sep. 12, 2001, now Pat. No. 7,349,905.

(51) Int. Cl.
| | |
|---|---|
| *G06F 17/30* | (2006.01) |
| *G06F 11/34* | (2006.01) |
| *G06F 7/00* | (2006.01) |
| *G06Q 10/10* | (2012.01) |
| *G06Q 10/06* | (2012.01) |

(52) U.S. Cl.
CPC .... *G06F 17/30554* (2013.01); *G06F 11/3495* (2013.01); *G06F 17/30067* (2013.01); *G06F 17/30286* (2013.01); *G06F 17/30595* (2013.01); *G06Q 10/06* (2013.01); *G06Q 10/10* (2013.01); *Y10S 707/99931* (2013.01)

(58) Field of Classification Search
CPC combination set(s) only.
See application file for complete search history.

(56) References Cited

U.S. PATENT DOCUMENTS 5,835,712 A * 11/1998 DuFresne ......... G06F 17/30893
707/999.01
6,266,774 B1   7/2001 Sampath et al.
(Continued)

*Primary Examiner* — Kuen S Lu
(74) *Attorney, Agent, or Firm* — Zagorin Cave LLP; Robert W. Holland

(57) ABSTRACT

A computerized method and system to communicate information between a supported client computer and a remote support organization have been described. At the supported client computer, status information, generated by one or more client applications when executing on the supported client computer, may be retrieved. The status information may be stored in a client database on the supported client computer. A first client database definition for a client data item may be mapped to a first tag, the first client database definition may be associated with the client database and the client data item may include the status information. A client message document including the first tag may be communicated to a support server of the remote support organization. The status information may be stored in, and retrieved from, the client database via a functional abstraction layer comprising one or more customized application program interfaces (API).

11 Claims, 5 Drawing Sheets

(56) References Cited

U.S. PATENT DOCUMENTS

| | | | | |
|---|---|---|---|---|
| 6,480,972 B1* | 11/2002 | Cromer | ............... | G06F 11/0748 |
| | | | | 714/25 |
| 6,615,213 B1* | 9/2003 | Johnson | ............ | G06F 17/30867 |
| | | | | 707/690 |
| 6,643,696 B2* | 11/2003 | Davis | ................. | G06F 11/3495 |
| | | | | 709/224 |
| 6,694,369 B1* | 2/2004 | Vepa | ........................ | H04L 43/50 |
| | | | | 709/203 |
| 6,718,387 B1* | 4/2004 | Gupta | ..................... | H04L 29/06 |
| | | | | 370/397 |
| 6,751,794 B1* | 6/2004 | McCaleb | .................. | G06F 8/65 |
| | | | | 707/999.202 |
| 6,760,748 B1* | 7/2004 | Hakim | ...................... | G09B 5/14 |
| | | | | 434/350 |
| 6,980,963 B1* | 12/2005 | Hanzek | .................. | G06Q 10/08 |
| | | | | 705/26.62 |
| 7,143,194 B1* | 11/2006 | Curley | .............. | G06F 17/30581 |
| | | | | 709/248 |
| 2002/0007468 A1* | 1/2002 | Kampe | ............... | H04L 41/0659 |
| | | | | 714/4.12 |
| 2002/0015042 A1* | 2/2002 | Robotham | ................. | G06F 3/14 |
| | | | | 345/581 |
| 2002/0035447 A1* | 3/2002 | Takahashi | ............... | H01L 22/20 |
| | | | | 702/188 |
| 2002/0087556 A1* | 7/2002 | Hansmann | ......... | G06F 17/30578 |
| 2002/0129331 A1* | 9/2002 | Zhang | ........................ | G06F 8/30 |
| | | | | 717/106 |
| 2003/0014477 A1* | 1/2003 | Oppenheimer | ..... | H04L 12/1813 |
| | | | | 709/203 |
| 2003/0037069 A1* | 2/2003 | Davison | ............ | G06F 17/30893 |
| 2003/0101238 A1* | 5/2003 | Davison | ............ | G06F 17/30893 |
| | | | | 709/219 |

\* cited by examiner

LOCAL CLIENT DATABASE FOR REMOTE SUPPORT

RELATED APPLICATIONS

This application is continuation of U.S. application Ser. No. 09/954,397 filed Sep. 12, 2001, entitled "Local Client Database For Remote Support," which is incorporated herein by reference.

FIELD OF THE INVENTION

This invention relates generally to a remote support network, and more particularly to a local support database on a supported client for storing status data and messages.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Everdream Corporation, All Rights Reserved.

BACKGROUND OF THE INVENTION

As personal computers become more common in homes and businesses without a dedicated technical support staff, the ability to provide problem resolution from a remote location becomes increasingly important. Current support solutions include remote control of a client computer through a network to enable support personnel to run diagnostic tests. However, when the problem is rooted in events that occurred many days previous to the symptoms, such remote control may be of little use. Therefore, there is a need to provide ongoing status information from a client computer to a remote support organization.

SUMMARY OF THE INVENTION

The above-mentioned shortcomings, disadvantages and problems are addressed by the present invention, which will be understood by reading and studying the following specification.

A computerized method and system to communicate information between a supported client computer and a remote support organization have been described. At the supported client computer, status information, generated by one or more client applications when executing on the supported client computer, may be retrieved. The status information may be stored in a client database on the supported client computer. A first client database definition for a client data item may be mapped to a first tag, the first client database definition may be associated with the client database and the client data item may include the status information. A client message document including the first tag may be communicated to a support server of the remote support organization. The status information may be stored in, and retrieved from, the client database via a functional abstraction layer comprising one or more customized application program interfaces (API).

In another aspect, the server can instruct the client computer to modify its database by creating a server message document from data in the server database. The corresponding server database definition is mapped to a tag that is used to create the server message document. When the client receives the server message document, it extracts the tag (and any associated data) and determines the appropriate API to call to modify the client database. If a new data element is being added to the client database, a new mapping is created to associate the definition of the new element with the tag. Modification of an existing element can also change the mapping associated with the data element.

The API layers in the message architecture isolate the other layers from the underlying database, allowing dissimilar database systems to be used on the client and server computer. The mapping layers enable the transferring of data and instructions between the client and server computer without reference to the database structures particular to the computers.

The layered message architecture enables a server on a remote support network to monitor subscribing clients with different configurations and consequently different databases. The layered message architecture can also be used by a server to log operations performed on a client, such as when monitoring compliance with hardware and software licenses or when enforcing security requirements.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into three sections and a conclusion. In the first section, the hardware and the operating environment in conjunction with which embodiments of the invention may be practiced are described. In the second section, a system level overview of the invention is presented. In the third section, methods for an embodiment of the invention are provided.

Operating Environment

Figure 1:
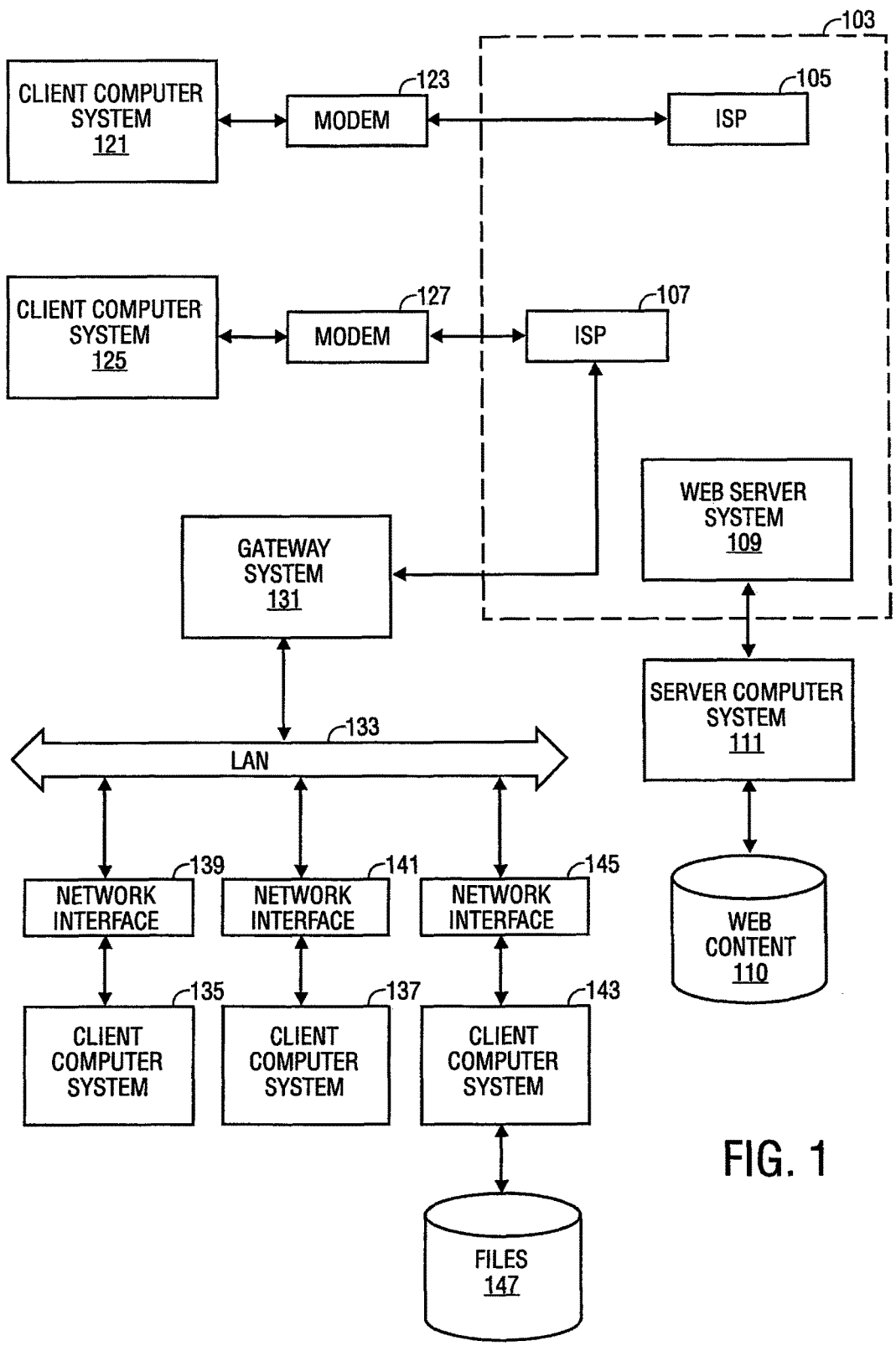
FIG. 1 is a diagram of one embodiment of an operating environment suitable for practicing the present invention.
Figure 2:
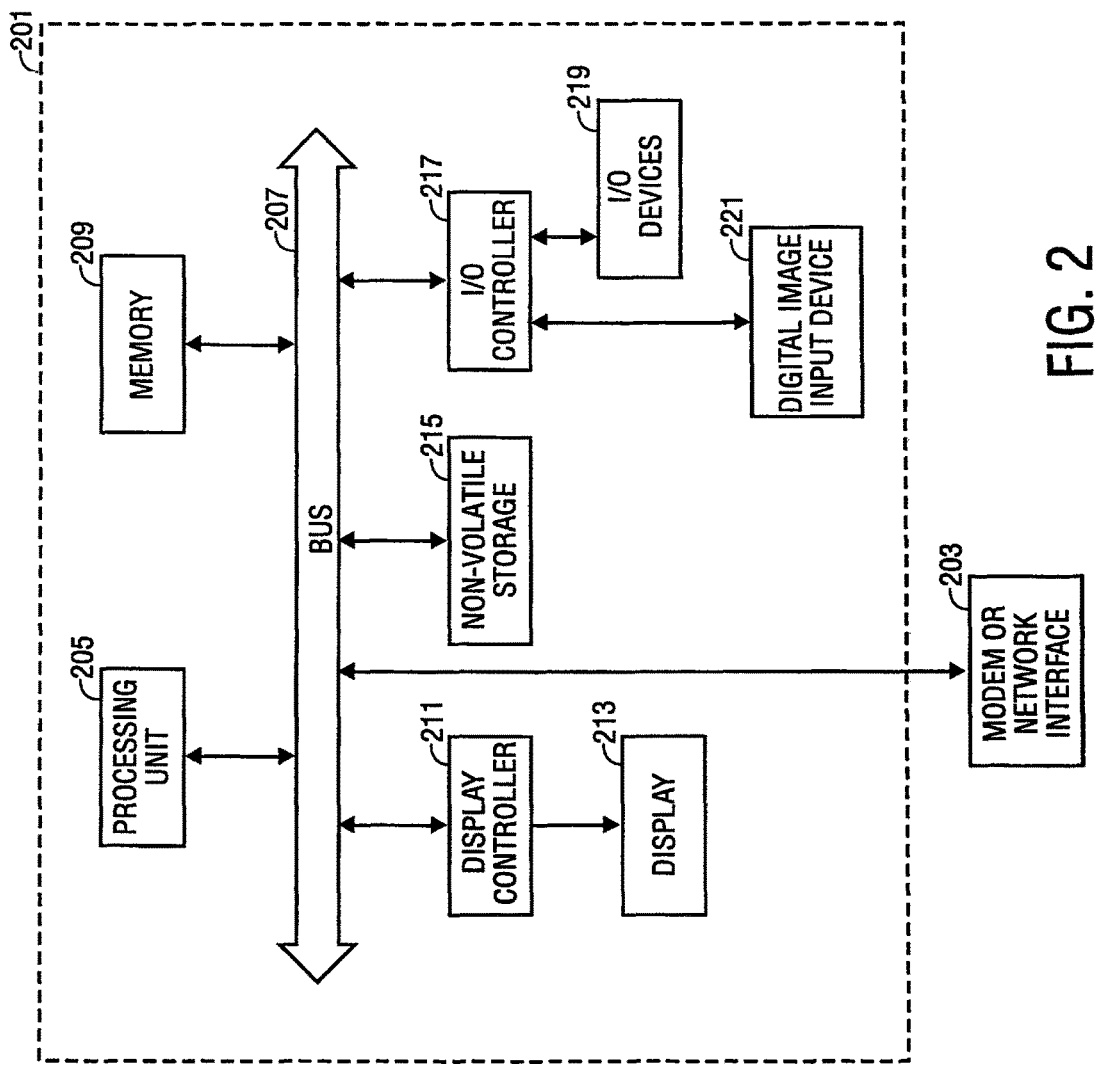
FIG. 2 is a diagram of one embodiment of a computer system suitable for use in the operating environment of FIG. 1.

The following description of FIGS. 1 and 2 is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 shows several computer systems that are coupled together through a network 103, such as the Internet. The term "Internet" as used herein refers to a network of networks which uses certain protocols, such as the TCP/IP protocol, and possibly other protocols such as the hypertext transfer protocol (HTTP) for hypertext markup language (HTML) and extensible markup language (XML) documents that make up the World Wide Web (web). The physical connections of the Internet and the protocols and communication procedures of the Internet are well known to those of skill in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML/XML format. These documents are often provided by web servers, such as web server 109 which is considered to be "on" the Internet. Often these web servers are provided by the ISPs, such as ISP 105, although a computer system can be set up and connected to the Internet without that system being also an ISP as is well known in the art.

The web server 109 is typically at least one computer system which operates as a server computer system and is configured to operate with the protocols of the World Wide Web and is coupled to the Internet. Optionally, the web server 109 can be part of an ISP which provides access to the Internet for client systems. The web server 109 is shown coupled to the server computer system 111 which itself is coupled to web content 110, which can be considered a form of a media database. It will be appreciated that while two computer systems 109 and 111 are shown in FIG. 1, the web server system 109 and the server computer system 111 can be one computer system having different software components providing the web server functionality and the server functionality provided by the server computer system 111 which will be described further below.

Client computer systems 121, 125, 135, and 137 can each, with the appropriate web browsing software, view HTML pages provided by the web server 109. The ISP 105 provides Internet connectivity to the client computer system 121 through the modem interface 123 which can be considered part of the client computer system 121. The client computer system can be a personal computer system, a network computer, a Web TV system, or other such computer system. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a LAN. While FIG. 1 shows the interfaces 123 and 127 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 135 and 137 are coupled to a LAN 133 through network interfaces 139 and 141, which can be Ethernet network or other network interfaces. The LAN 133 is also coupled to a gateway computer system 131 which can provide firewall and other Internet related services for the local area network. This gateway computer system 131 is coupled to the ISP 107 to provide Internet connectivity to the client computer systems 135 and 137. The gateway computer system 131 can be a conventional server computer system. Also, the web server system 109 can be a conventional server computer system.

Alternatively, as well-known, a server computer system 143 can be directly coupled to the LAN 133 through a network interface 145 to provide files 147 and other services to the clients 135, 137, without the need to connect to the Internet through the gateway system 131.

FIG. 2 shows one example of a conventional computer system that can be used as a client computer system or a server computer system or as a web server system. It will also be appreciated that such a computer system can be used to perform many of the functions of an Internet service provider, such as ISP 105. The computer system 201 interfaces to external systems through the modem or network interface 203. It will be appreciated that the modem or network interface 203 can be considered to be part of the computer system 201. This interface 203 can be an analog modem, ISDN modem, cable modem, token ring interface, satellite transmission interface (e.g. "Direct PC"), or other interfaces for coupling a computer system to other computer systems. The computer system 201 includes a processor 205, which can be a conventional microprocessor such as an Intel Pentium microprocessor or Motorola Power PC microprocessor. Memory 209 is coupled to the processor 205 by a bus 207. Memory 209 can be dynamic random access memory (DRAM) and can also include static RAM (SRAM). The bus 207 couples the processor 205 to the memory 209 and also to non-volatile storage 215 and to display controller 211 and to the input/output (I/O) controller 217. The display controller 211 controls in the conventional manner a display on a display device 213 which can be a cathode ray tube (CRT) or liquid crystal display. The input/output devices 219 can include a keyboard, disk drives, printers, a scanner, and other input and output devices, including a mouse or other pointing device. The display controller 211 and the I/O controller 217 can be implemented with conventional well known technology. A digital image input device 221 can be a digital camera which is coupled to an I/O controller 217 in order to allow images from the digital camera to be input into the computer system 201. The non-volatile storage 215 is often a magnetic hard disk, an optical disk, or another form of storage for large amounts of data. Some of this data is often written, by a direct memory access process, into memory 209 during execution of software in the computer system 201. One of skill in the art will immediately recognize that the term "computer-readable medium" includes any type of storage device that is accessible by the processor 205 and also encompasses a carrier wave that encodes a data signal.

It will be appreciated that the computer system 201 is one example of many possible computer systems which have different architectures. For example, personal computers based on an Intel microprocessor often have multiple buses, one of which can be an input/output (I/O) bus for the peripherals and one that directly connects the processor 205 and the memory 209 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 209 for execution by the processor 205. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

It will also be appreciated that the computer system 201 is controlled by operating system software which includes a file management system, such as a disk operating system, which is part of the operating system software. One example of an operating system software with its associated file management system software is the operating system known as Windows '95® from Microsoft Corporation of Redmond, Wash., and its associated file management system. The file management system is typically stored in the non-volatile storage 215 and causes the processor 205 to execute the various acts required by the operating system to input and output data and to store data in memory, including storing files on the non-volatile storage 215.

System Level Overview

A system level overview of the operation of an embodiment of the invention is described by reference to FIG. 3, which illustrates a layered message architecture 300 for client and server computers connected to form a distributed support network. The distributed support network is envisioned as a wide-area network such as the Internet 103 shown in FIG. 1 as connecting client computer 125 to server computer 143.

Support applications 305 executing on the client 301 store status data into a local database 313. Such support applications include diagnostic programs that store diagnostics results, backup utilities that store a list of files backed up, a computer health agent that stores configuration changes, and a patch checker that stores information for an automatic system update feature. In response to a command from a support application, a request from a remote server 303, or on a pre-determined schedule, status messages are generated from the data in the local database 313 and displayed by a message handler 321 executing on the server 303. A client database interface 307 provides a functional abstraction layer between the database system 309 by exposing a customized set of APIs (application program interfaces) to the support applications 305 so that the application programmer can view the underlying database system as a "lightweight" database with simplified commands. The client database interface 307 allows for easier creation of the support applications 305 and also enables data independence by isolating the support applications 305 and the message architecture 300 from the underlying database system 309.

The messages exchanged between the client 301 and the server 303 are in the form of XML (extensible markup language) documents encoded according to a particular communications protocol understood by the message handler 321. A client database-to-XML mapper 315 determines the appropriate XML tags that identify the status data, and passes the tags and data to an XML writer 317, which composes the corresponding XML document. Static text for the message can be stored separately or in the client database 313. A communications protocol layer 319 encodes and transmits the XML document over the network 335 to the server 303. The message handler 321 receives the XML document and displays it in a communications window 337.

The client status data can also be stored in a remote database 333 on the server 303 for subsequent analysis by extracting the tags and data from the document using an XML parser 323 and passing them to a server database-to-XML mapper 325, which determines the server database records that will be created for the status data. The server database-to-XML mapper 325 calls the server database interface 327, which causes the data to be stored in the server database 333. As with the client database interface 307, the server database interface 327 provides data independent for the server 303. The layered message architecture 300 also allows the implementation of dissimilar databases on the client and server.

Figure 3:
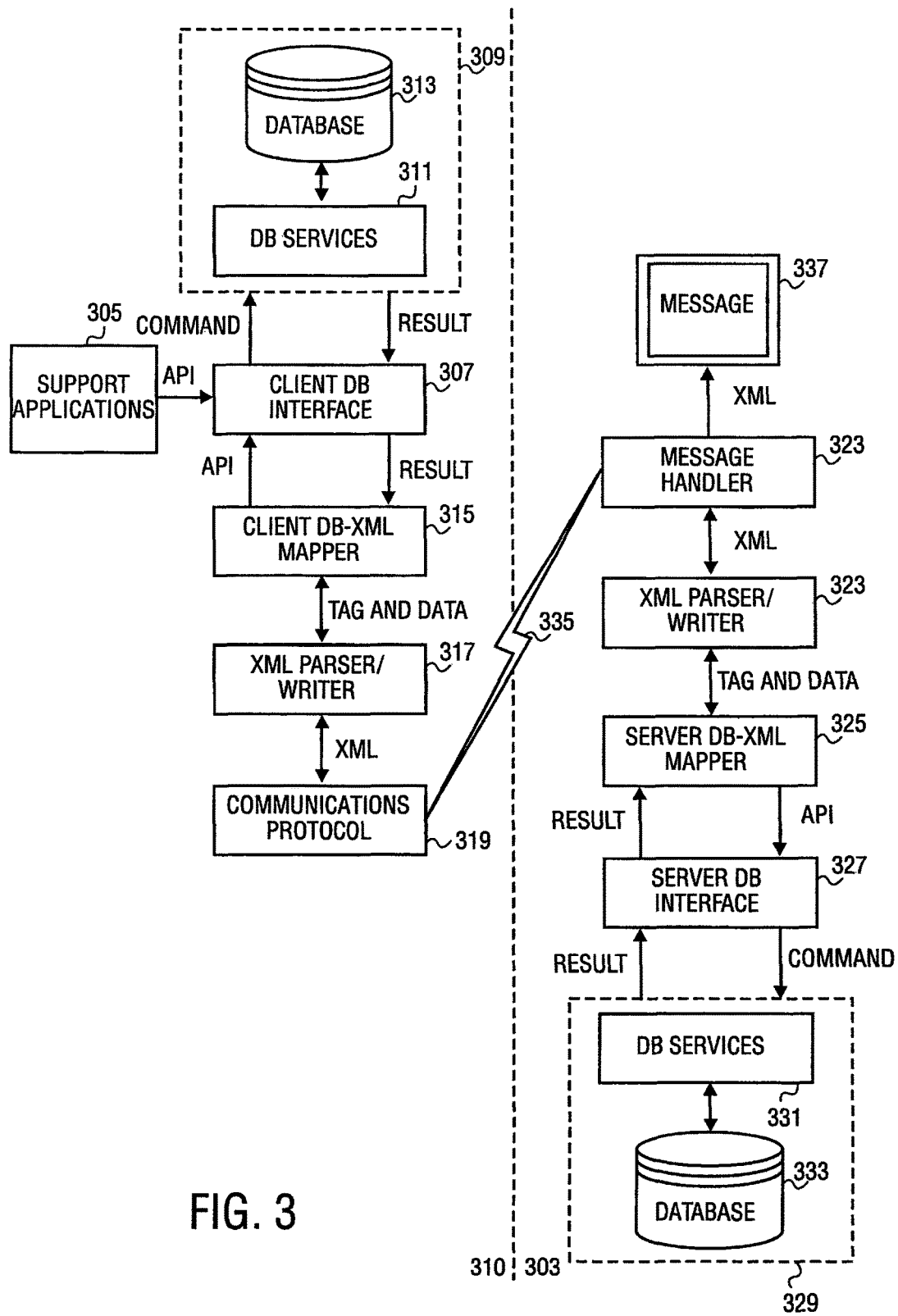
FIG. 3 is a diagram illustrating a system-level overview of an embodiment of the invention.

In the embodiment shown in FIG. 3, the message handler 321 also schedules messages, either broadcast or client-specific, to be transmitted over the network 335. In an alternate embodiment not illustrated, the message handled 321 is instructed to send a particular message by an program executing on the server. Server messages may be a request for data or may be an instruction to modify the definition of the client database by adding or changing data elements, such as when a new service provided by the server has been requested by the client. The message information is retrieved from the server database system 329, mapped into the appropriate tags and data by the server database-to-XML mapper 325, which are subsequently used by the XML writer 323 to compose the XML document for the message. When message is received by the communications protocol 319 on the client, it extracts the XML document and passes the document to the XML parser 317. The tags and data extracted by the XML parser are used by the client database-to-XML mapper 315 as input to an API that causes a corresponding database command to be issued to the client database system 309. The results of the database operation are passed back up the layers of the client message architecture for transmission to the server 303 as status data and/or an operation result code. The results also may be displayed as a message 306 at the client 301 in a viewing area on a screen attached to the client. In one embodiment, the viewing area may be part of a "toolbar" provided to the client 301 by the server 303 and which is actively displayed according to preferences set at the client 301. In an alternate embodiment, the viewing area may presented within a separate window on the screen.

XML documents are particularly suited for use with the invention because XML tags can be defined that are specific to the data and data structures required. Additionally, as shown in the examples set forth below, because XML can "wrap" standard database query commands within XML frames, no special query language is required to practice the invention. However, the invention is not limited to XML and similar language wrappers are considered within the scope of the invention. When wrapping standard SQL commands, the SQL operator "in" is extended to allow the dynamic selection of a database so that the originator of the SQL command can issue the command without having a permanent connection to the database.

```
<xmldb:frame>
    <COMMAND: sql>
    <SQLtext>
        select * from ORDERS in DBMAIN
    </>
    </>
</>
<xmldb:frame>
    <COMMAND:sql>
    <SQLtext>
    alter table ORDERS in DBMAIN add column QTY
    </>
    </>
</>
```

The database designation is extracted from the text enclosed by the SQLtext tags and a connection is made to the appropriate database before the command is processed.

In one embodiment of the message architecture, the XML parsers and writers 317, 323 are commercially available software components such as available from Apache, Oracle, Sun or Microsoft. Database systems suitable for the client and/or server database systems 309, 329 are available from Oracle, Microsoft, Sybase, or other database vendors. In one embodiment, the server database system 329 is a relational system from Oracle, while the client database system is Access/JET from Microsoft. In yet another embodiment, the server database interface 327 is composed of JDBC APIs available from Sun Microsystems, while the client database interface 307 is written to provide a minimal set of APIs for accessing the client database.

It will be appreciated that when the network 335 is an untrusted network, such as the Internet, the client computer 313 may coupled to the network 335 through a firewall device (not shown) to protect the client 335 from attack. In such a case, the communications protocol 319 must be capable of transmitting information from the server 303 to the client 313 through the firewall. Because most firewalls do not block HTTP (HyperText Transfer Protocol) packets, in one embodiment, the communication protocol 319 is a tunneling protocol that layers TCP (Transmission Control Protocol) packets on top of the HTTP, such as the Firewall Enhancement Protocol currently under consideration by the Internet Engineering Task Force as Request For Comment 3093. In another embodiment, because typical firewalls only block unsolicited messages, the communications protocol 319 at the client 313 periodically sends request messages to the server 303 and the server 303 sends the necessary information as responses to the request messages.

Because the contents of the client database 313 are mirrored on the server database 333, any changes made to the contents or structure of the client database 313 while the client 301 is disconnected from the network 335 are uploaded through the layered message architecture 300 to the server 303 when the client 301 reconnects. In one embodiment, a specialized support application is responsible for determining the changes upon reconnection. Additionally, changes applied to the server database 333 that affect the client 301 are downloaded through the layered message architecture 300 in response to the client 301 uploading the changes.

The system level overview of the operation of an embodiment of the invention has been described in this section of the detailed description. A layered message architecture for networked client and server computers enables the storage of client status information in dissimilar databases on the computers and provides for the modification of the client database by the server. While the invention is not limited to any particular message format, XML has been used to illustrate the invention. It will be appreciated that other types of document formats that enable the exchange of commands and data between the client and server computers could be substituted for the XML format described above without departing from the scope of the invention. Furthermore, although the invention has been described in terms of remote support network, it will be readily apparent to one of skill in the art that the layered message architecture can be used in any client-server network in which data must be mirrored on dissimilar client and server databases.

Methods of Embodiments of the Invention

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media) acting as clients or servers in accordance with the invention. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figures 4A, 4B:
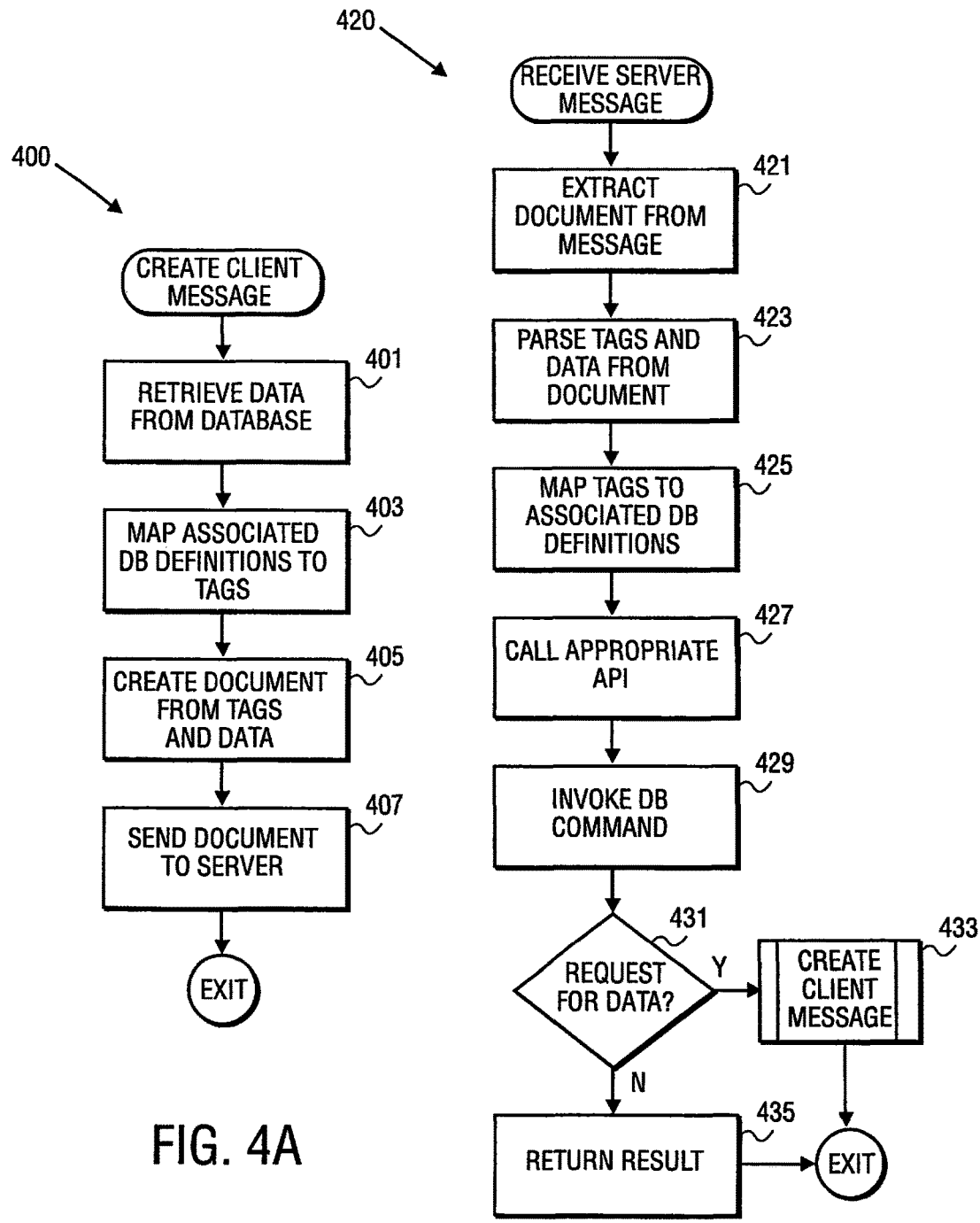
FIGS. 4A-B are flowcharts of methods to be performed by a client computer according to an embodiment of the invention.

FIGS. 4A and 4B illustrate embodiments of methods executed by a client computer to implement the invention. Referring first to FIG. 4A, a create client message method 400 is executed when the client computer determines that it should send data to the server computer. The determination can be schedule-based, upon direction from an application executing on the client computer, or as a result of receiving a server message requesting status data (illustrated in FIG. 4B and explained below). The create client message method 400 begins by retrieving the appropriate data from the database (block 401). The method 400 maps the corresponding database definition for the retrieved data to a document tag using a mapping data structure that contains associations between the database definitions and pre-defined document tags (block 403). The method 400 creates a document from the tags and the data (block 405) and sends the document to the server (block 407).

Turning now to FIG. 4B, a received server message method 420 is described that is executed by the client computer when it receives a message from the server as described below in conjunction with FIG. 5B. The method 420 begins by extracting the document from the message (block 421). It parses the tags and the data from the document (block 423) and maps the tags to the associated database definitions (block 425). This is the inverse of the mapping process used when creating a client message and it will be apparent to one of skill in the art that the same mapping data structures are used here. The client message method 420 determines and calls the appropriate API to access the data in the database (block 427). The appropriate API can be designated by a tag within the document, text within the document, a message identifier contained within the document, or other information as will be readily apparent to one of skill in the art. The execution of the API causes a corresponding database command to be invoked (block 429). If the message is a request for data (block 431), the data is extracted from the database and used to create the client message (block 433) as illustrated and described previously in conjunction with FIG. 4A. If the request is an instruction to add or modify the database definition, the message method 420 returns a result code reporting the execution status of the change to the server (block 435).

Figures 5A, 5B:
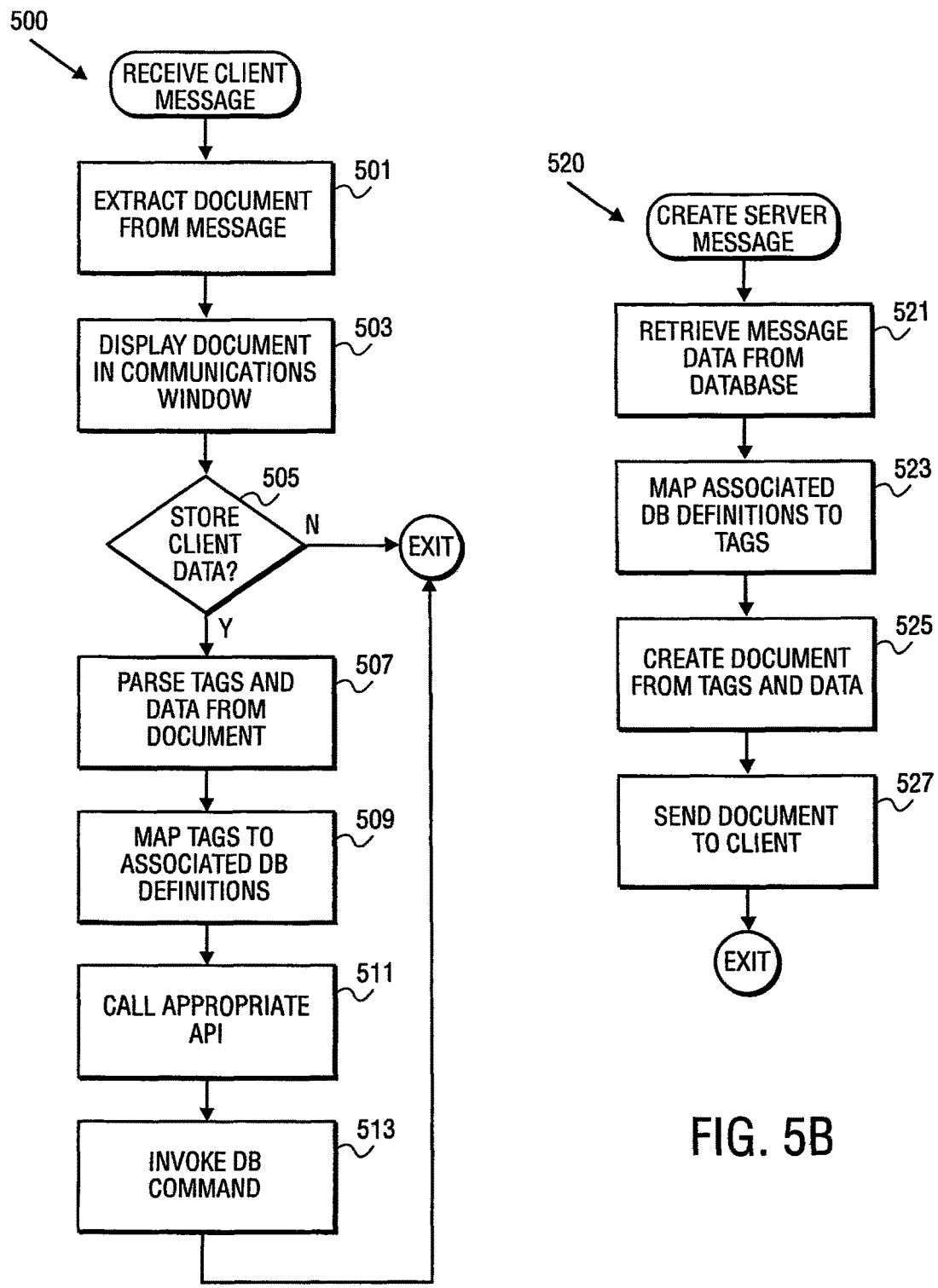
FIGS. 5A-B are flowcharts of methods to be performed by a server computer according to an embodiment of the invention.

FIGS. 5A and 4B illustrates embodiments of methods executed by a server computer to implement the invention. When a client message is received by the server, a received client message method illustrated in FIG. 5A is executed. The document is extracted from the method message (block 501) and displayed in the communications window (block 503). In an embodiment in which the document is an XML formatted document, it may be displayed within a browser window such as is commonly used to display Internet web documents. Alternate embodiments using other document formats that can be displayed by other types of applications are also considered within the scope of the invention.

The message method 500 determines whether the message contains data from the client that should be stored in the server's database (block 505). If so, the method 500 parses the tags and the data from the document (block 507) and maps the tags to appropriate server database definitions (block 509). The mapping at the server is similar, but is not necessarily identical, to the mapping that is performed at the client computer because the databases maintained on the client and server are likely dissimilar since the server maintains data related to multiple clients while the client is concerned only with its own information. The method 500 calls an API (block 511) to cause the appropriate database command to store the data in the server database according to the database definition (block 513).

The server may also send messages to the client to request data or to instruct the client to modify the definition of its database by executing a create server message method 520 illustrated in FIG. 5B. The message method 520 begins by retrieving the message data from the database (block 521). It will be appreciated that the entire message may be stored in the database if such a message is a generalized broadcast message for all clients, or the message may be message text and data specific to a client if the message is for a single client. The message text can be stored separately from the data in the database. The database definitions for the retrieved message data is mapped to the appropriate document tags at block 523. The document is created from the tags and the data (block 525) and sent to the client or client computers at block 527.

The particular methods performed by clients and servers for an embodiment of the invention have been described. The methods performed by the client has been shown by reference to flowcharts in FIGS. 4A-B including all the acts from 401 until 407, and from 421 until 435. The methods performed by the server has been shown by reference to flowcharts in FIGS. 5A-B including all the acts from 501 until 513, and from 521 until 527.

CONCLUSION

A layered message architecture has been described that communicates status data from a client computer to a server through a remote support network. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. In particular, while the invention has been described in terms of a single server performing the functions and methods described above, the invention is not so limited and is equally applicable to networks or clusters of servers. The terminology used in this application with respect to clients and server is meant to include all networked environments. Therefore, it is manifestly intended that this invention be limited only by the following claims and equivalents thereof.

What is claimed is:

1. A method for communicating information between a client computer and a server to provide remote support of the client, the method comprising:
   generating status information by one or more support applications executing on the client computer, the one or more support applications including at least a diagnostic function that stores diagnostics results as status information, the status information relating to operations of the client computer;
   storing the status information in a client computer database on the client computer;
   mapping a database definition of the client computer database for a data item to a first tag, the client data item including the status information; and
   communicating the first tag to the server through a network having a server database dissimilar from the client computer database;
   wherein the storing the status information, mapping and communicating are supported with tags communicated between the client and server, the tags relating the client computer database and the server database, and the tags are managed to store the status information in the client database and the server database through a functional abstraction layer comprising an application program interface that translates between the dissimilar client and server databases.

2. The method of claim 1 wherein the communicating the first tag to the server further comprises retrieving the status information from the server database via a functional abstraction layer comprising the application program interface.

3. The method of claim 1, in which the mapping associates the dissimilar client computer and server database definitions with pre-defined document tags.

4. The method of claim 1 further comprising:
receiving at the computer a message document from the server, the message document including a second tag, the second tag mapped from a server database definition for a server data item; and
invoking a client database command on the client database in response to the receiving of the server message document.

5. The method of claim 4, wherein invoking the client database command further comprises:
parsing the second tag from the server message document;
mapping the second tag to a second client database definition; and
calling an application program interface (API) to invoke a database command that retrieves a client data item defined by the second tag from the client database.

6. The method of claim 4 wherein invoking the client database command further comprises:
parsing the second tag from the server message document;
modifying the client database in accordance with the second tag; and
modifying the mapping between a plurality of tags and a plurality of database definitions in accordance with the second tag.

7. The method of claim 6, wherein modifying the mapping comprises adding a new database definition corresponding to the second tag.

8. The method of claim 4, wherein invoking the client database command further comprises:
parsing the second tag and a server data item associated with the second tag from the server message document; and
modifying the client database with the server data item in accordance with the second tag.

9. The method of claim 4, which comprises displaying the server message document on the supported client computer.

10. The method of claim 4, which comprises:
detecting a change in configuration of the client database of the supported client computer;
generating the status information in response to the change; and
periodically communicating the status information in the client message document to the support server.

11. A non-transitory computer-readable medium including instructions which, when executed by one or more computers, perform the method of claim 1.

* * * * *